US011821540B2

(12) United States Patent
Hayama et al.

(10) Patent No.: US 11,821,540 B2
(45) Date of Patent: Nov. 21, 2023

(54) CAPACITY CONTROL VALVE (71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/599,467

(22) PCT Filed: Apr. 2, 2020

(86) PCT No.: PCT/JP2020/015176
§ 371 (c)(1),
(2) Date: Sep. 28, 2021

(87) PCT Pub. No.: WO2020/204132
PCT Pub. Date: Oct. 8, 2020

(65) Prior Publication Data
US 2022/0178461 A1 Jun. 9, 2022

(30) Foreign Application Priority Data
Apr. 3, 2019 (JP) .................................. 2019-071631

(51) Int. Cl.
*F16K 31/383* (2006.01)
*F16K 17/04* (2006.01)
(Continued)

(52) U.S. Cl.
CPC ........ *F16K 31/383* (2013.01); *F16K 17/0406* (2013.01); *F04B 49/12* (2013.01); *F04B 49/22* (2013.01)

(58) Field of Classification Search
CPC .. F04B 49/22; F04B 49/12; F04B 2027/1859; F16K 31/383; F16K 17/0406
See application file for complete search history.

(56) References Cited

U.S. PATENT DOCUMENTS 3,765,644 A 10/1973 Zeuner ................ F16K 31/0655
4,291,860 A 9/1981 Bauer ................. F16K 31/0655
(Continued)

FOREIGN PATENT DOCUMENTS

CN 2869383 2/2007 ............. F04B 49/22
CN 102384056 3/2012 ............. F04B 27/14
(Continued)

OTHER PUBLICATIONS

International Preliminary Report on Patentability issued in PCT International Patent Application Serial No. PCT/JP2020/015177, dated Oct. 14, 2021 with translation (6 pgs).
(Continued)

*Primary Examiner* — Jessica Cahill
(74) *Attorney, Agent, or Firm* — HAYES SOLOWAY P.C.

(57) ABSTRACT

A capacity control valve in which control precision is high is provided. A capacity control valve V includes a valve housing provided with a suction port through which a suction fluid of suction pressure Ps passes, and a control port through which a control fluid of control pressure Pc passes, a pressure drive portion that receives a force in the contracting direction from the suction fluid, and a main valve formed by a valve element that receives a force in the valve opening direction from the pressure drive portion, and a valve seat with and from which the valve element is brought into contact and separated. The valve element is arranged to receive a force in the closing direction from the control fluid.

11 Claims, 4 Drawing Sheets

(51) Int. Cl.
*F04B 49/12* (2006.01)
*F04B 49/22* (2006.01)

(56) References Cited

U.S. PATENT DOCUMENTS

| | | | | |
|---|---|---|---|---|
| 5,022,629 | A | 6/1991 | Tibbals | B05B 1/3053 |
| 5,076,538 | A | 12/1991 | Mohr | B60T 15/028 |
| 5,401,087 | A | 3/1995 | Goossens | F16J 15/56 |
| 5,503,184 | A | 4/1996 | Reinartz | B60T 8/367 |
| 6,217,292 | B1 * | 4/2001 | Ota | F04B 27/1804 |
| | | | | 251/61.3 |
| 6,234,763 | B1 * | 5/2001 | Ota | F04B 27/1804 |
| | | | | 251/61.5 |
| 6,244,159 | B1 | 6/2001 | Kimura et al. | F01B 3/02 |
| 6,250,600 | B1 * | 6/2001 | Kumagai | G05D 16/0619 |
| | | | | 251/61.3 |
| 6,350,106 | B1 * | 2/2002 | Shimizu | F04B 27/1804 |
| | | | | 417/222.2 |
| 6,398,516 | B1 | 6/2002 | Kawaguchi et al. | 417/222.2 |
| 6,443,708 | B1 | 9/2002 | Hirota | F04B 27/1804 |
| 6,481,976 | B2 | 11/2002 | Kimura | F04B 27/1804 |
| 6,585,494 | B1 | 7/2003 | Suzuki | F25K 9/008 |
| 6,644,621 | B2 | 11/2003 | Ji | B60T 13/686 |
| 6,772,990 | B2 | 8/2004 | Sasaki et al. | F94B 49/00 |
| 6,893,215 | B2 | 5/2005 | Kuwabara et al. | F01D 25/26 |
| 6,976,665 | B2 | 12/2005 | Seitz | B60T 8/363 |
| 7,014,427 | B1 | 3/2006 | Hirota | 417/218 |
| 8,418,723 | B2 | 4/2013 | Tsuchiya | F16K 31/0655 |
| 8,550,427 | B2 | 10/2013 | Yoshida | B60T 8/363 |
| 9,334,978 | B2 | 5/2016 | Lappan | F04C 2/3442 |
| 9,581,149 | B2 | 2/2017 | Ota et al. | F04B 27/1804 |
| 10,316,975 | B2 | 6/2019 | Fangauer | F16K 1/38 |
| 10,781,804 | B2 | 9/2020 | Higashidozono | F04B 27/18 |
| 10,823,162 | B2 | 11/2020 | Kume et al. | F04B 27/18 |
| 11,215,293 | B2 | 1/2022 | Fukuda | F04B 53/10 |
| 11,480,166 | B2 | 10/2022 | Hayama | F04B 27/10 |
| 2002/0031432 | A1 | 3/2002 | Ota et al. | F04B 1/26 |
| 2002/0098091 | A1 * | 7/2002 | Umemura | F04B 27/1804 |
| | | | | 417/222.2 |
| 2003/0019226 | A1 | 1/2003 | Hirota | F04B 27/1804 |
| 2004/0060604 | A1 | 4/2004 | Uemura | G05D 16/2024 |
| 2004/0091368 | A1 * | 5/2004 | Kainuma | F04B 27/1804 |
| | | | | 417/222.2 |
| 2005/0287014 | A1 | 12/2005 | Umemura et al. | F04B 1/26 |
| 2006/0237552 | A1 | 10/2006 | Umemura | F16K 31/0655 |
| 2007/0164244 | A1 | 7/2007 | Kratzer | F16K 31/0658 |
| 2008/0175727 | A1 | 7/2008 | Umemura | F04B 27/1804 |
| 2011/0091334 | A1 | 4/2011 | Taguchi | F04B 27/1804 |
| 2012/0056113 | A1 | 3/2012 | Tano et al. | F16K 31/12 |
| 2013/0291963 | A1 | 11/2013 | Futakuchi et al. | B60H 1/00 |
| 2014/0369862 | A1 * | 12/2014 | Ota | F04B 27/1804 |
| | | | | 417/222.2 |
| 2015/0044065 | A1 | 2/2015 | Ota et al. | F04B 27/18 |
| 2015/0211502 | A1 | 7/2015 | Ota et al. | F04B 7/0076 |
| 2016/0186733 | A1 | 6/2016 | Sugamura et al. | F04B 27/1804 |
| 2019/0331249 | A1 | 10/2019 | Borja | F16K 1/44 |

FOREIGN PATENT DOCUMENTS

| | | | | |
|---|---|---|---|---|
| CN | 103671033 | | 3/2014 | F04B 39/08 |
| CN | 105736308 | | 7/2016 | F04B 39/00 |
| CN | 109416133 | | 3/2019 | F16K 31/06 |
| EP | 0255764 | | 7/1987 | F04B 1/28 |
| EP | 0945617 | | 9/1999 | F04B 27/18 |
| EP | 0980976 | | 2/2000 | F04B 27/18 |
| EP | 1091125 | | 4/2001 | F04B 27/18 |
| EP | 1098091 | | 5/2001 | F04B 27/18 |
| EP | 1052124 | | 11/2002 | B60H 1/32 |
| EP | 1279831 | | 1/2003 | F04B 27/18 |
| EP | 1375918 | A1 * | 1/2004 | F04B 27/1804 |
| EP | 1512871 | | 3/2005 | F04B 27/18 |
| EP | 2952741 | | 12/2015 | F16K 31/06 |
| GB | 787961 | * | 12/1957 | |
| JP | 3242496 | B2 * | 7/1993 | |
| JP | 7-27049 | | 1/1995 | F04B 24/10 |
| JP | 2000-87849 | | 3/2000 | F04B 27/14 |
| JP | 2000-161234 | | 6/2000 | F04B 49/00 |
| JP | 2002-70732 | | 3/2002 | F04B 27/14 |
| JP | 2002-201913 | | 7/2002 | F01D 11/00 |
| JP | 2003-322086 | | 11/2003 | F04B 49/00 |
| JP | 3581598 | | 7/2004 | F04B 29/10 |
| JP | 2006-17087 | | 1/2006 | F04B 27/14 |
| JP | 2006-52648 | | 2/2006 | F06B 27/14 |
| JP | 3783434 | | 3/2006 | F04B 27/14 |
| JP | 2011-94554 | | 5/2011 | F04B 27/14 |
| JP | 2014-80927 | | 5/2014 | F04B 27/14 |
| JP | 2014-126025 | | 7/2014 | F04B 27/14 |
| JP | 2015-1168 | | 1/2015 | F04B 27/14 |
| JP | 2015-34510 | | 2/2015 | F04B 27/14 |
| JP | 5983539 | | 8/2016 | F04B 27/18 |
| JP | 2017-31834 | | 2/2017 | F04B 27/18 |
| JP | 2018-3884 | | 1/2018 | F16K 31/06 |
| WO | WO2005095796 | | 10/2005 | F04B 27/14 |
| WO | WO2012/077439 | | 6/2012 | F04B 27/14 |
| WO | WO2015093502 | | 6/2015 | F04B 49/80 |
| WO | WO2017057160 | | 4/2017 | F04B 27/18 |

OTHER PUBLICATIONS

International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
Chinese Official Action issued in related Chinese Application Serial No. 202080026556.1, dated Oct. 9, 2022, 9 pages.
Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4 dated Oct. 21, 2022, 11 pages.
European Search Report issued in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.

(56) References Cited

OTHER PUBLICATIONS

European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
Official Action issued in related U.S. Appl. No. 17/599,474, dated Mar. 2, 2023, 11 pages.
Official Action issued in related U.S. Appl. No. 17/599,520, dated Jan. 30, 2023, 8 pages.
Korean Official Action issued in related application serial No. 10-2021-7036305, dated Mar. 15, 2023, 8 pages with translation.
Chinese Official Action issued in related application serial No. 202080026419.8, dated May 24, 2023, 10 pages with translation.
Official Action issued in related U.S. Appl. No. 17/599,474, dated Jun. 27, 2023, 13 pages.
U.S. Appl. No. 17/599,520, filed Sep. 28, 2020, Hayama et al.
U.S. Appl. No. 17/600,529, filed Sep. 30, 2020, Hayama et al.
U.S. Appl. No. 17/599,474, filed Sep. 28, 2020, Hayama et al.
U.S. Appl. No. 17/599,467, filed Sep. 28, 2020, Hayama et al.
U.S. Appl. No. 17/603,291, filed Oct. 12, 2021, Fukudome et al.
U.S. Appl. No. 17/603,284, filed Oct. 12, 2021, Hayama et al.
Chinese Official Action issued in related application serial No. 202080026542.X, dated Mar. 16, 2023, 11 pages with translation.
Chinese Official Action issued in related application serial No. 202080026977.4, dated Apr. 20, 2023, 12 pages with translation.
Official Action issued in related U.S. Appl. No. 17/603,284, dated May 23, 2023, 10 pages.
Official Action issued in related U.S. Appl. No. 17/603,291, dated May 8, 2023, 9 pages.

\* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve.

In such a capacity control valve, by moving a valve element integrally attached to a bellows in the axial direction, a flow to balance the control pressure Pc and the suction pressure Ps is generated, the control pressure Pc that moves the valve element in the opening direction is applied to the valve element, and the suction pressure Ps of the suction chamber is supplied to a space in which the bellows is housed.

At the time of continuously driving the variable displacement compressor, by moving the valve element in the axial direction by the control pressure Pc and the suction pressure Ps, the capacity control valve opens and closes a main valve to adjust the control pressure Pc of the control chamber of the variable displacement compressor. By controlling the pressure of the control chamber in the variable displacement compressor, the tilt angle of the swash plate with respect to the rotating shaft is continuously changed, the stroke amount of the pistons is changed to increase and decrease the discharge amount of the fluid to be discharged. Thus, a cooling ability of the air conditioning system is adjusted (see Patent Citation 1).

CITATION LIST

Patent Literature

Patent Citation 1: JP 3783434 B2 (PAGE 20-22, FIG. 11)

SUMMARY OF INVENTION

Technical Problem

However, in Patent Citation 1, at the time of continuously driving the variable displacement compressor, the capacity control valve can autonomically control the control pressure Pc of the control chamber by the control pressure Pc of the control chamber and the suction pressure Ps of the suction chamber. However, the control pressure Pc is applied in the direction in which the valve element is applied in the opening direction. Thus, when the control pressure Pc becomes instantaneously high by outside vibration, etc., there is a possibility that the valve element is opened due to malfunction. When the valve element is opened, there is a possibility that a control fluid of the control pressure Pc flows into the suction chamber and is applied in the direction in which the bellows is excessively contracted.

The present invention is achieved focusing on such problems, and an object thereof is to provide a capacity control valve in which control precision is high.

Solution to Problem

In order to solve the foregoing problems, a capacity control valve according to the present invention is a capacity control valve including: a valve housing provided with a suction port through which a suction fluid of suction pressure passes, and a control port through which a control fluid of control pressure passes; a pressure drive portion that receives a force in a contracting direction from the suction fluid, the contracting direction being a direction in which the pressure drive portion is contractable; and a main valve formed by a valve element that receives a force in a valve opening direction of the main valve from the pressure drive portion, and a valve seat with and from which the valve element is brought into contact and separated, wherein the valve element is arranged to receive a force in a valve closing direction of the main valve from the control fluid. According to the aforesaid feature of the present invention, the valve element receives the force in the closing direction by the control fluid. Thus, even when a change is made in such a manner that the control pressure of the control fluid is increased, such malfunction that the main valve is opened does not occur. It is possible to apply this capacity control valve to a variable displacement compressor of a type in which a stroke amount of pistons is changed based on an increase in the control pressure.

It may be preferable that a through hole is formed in the valve housing, and a rod that transmits the force in the valve opening direction of the main valve from the pressure drive portion to the valve element is slidably fitted into the through hole. According to this preferable configuration, even when the control fluid of the control pressure flows from the control port into the suction port at the time of opening the main valve, it is possible to suppress inflow to the pressure drive portion. Thus, the pressure drive portion senses highly responsively by the suction pressure of the suction fluid.

It may be preferable that a spring that biases the valve element in the valve closing direction of the main valve is arranged in the valve housing. According to this preferable configuration, the valve element is biased to the valve seat at the time of closing the main valve, and the valve element receives from the rod and the spring the forces in opposite directions from each other at the time of opening the main valve. Thus, even when vibration, etc. occurs, a closed or opened state of the main valve is stably maintained.

It may be preferable that the valve element may be a spherical body. According to this preferable configuration, it is possible to sufficiently ensure a pressure receiving area where the valve element receives from the suction fluid and the control fluid.

It may be preferable that the capacity control valve further includes a case fixed to the valve housing and having the pressure drive portion housed therein, and the case is provided with a second suction port through which the suction fluid of the suction pressure passes. According to this preferable configuration, it is possible to separate and isolate a space in which the pressure drive portion is housed and a space in which the main valve is arranged from each other.

DESCRIPTION OF EMBODIMENTS

Modes for carrying out a capacity control valve according to the present invention will be described below based on an embodiment.

Embodiment

A capacity control valve according to an embodiment will be described with reference to FIGS. 1 to 3. Hereinafter, description will be given with the left and right sides seen from the front side of FIG. 1 being the left and right sides of the capacity control valve.

A capacity control valve V according to the embodiment of the present invention is assembled into a variable displacement compressor (not shown) used for an air conditioning system of an automobile, etc. By variably controlling pressure of a working fluid (hereinafter, simply referred to as the "fluid") serving as a coolant, a discharge amount of the variable displacement compressor is controlled and the air conditioning system is adjusted to have a desired cooling ability.

First, the variable displacement compressor will be described. The variable displacement compressor has a casing including a discharge chamber, a suction chamber, a control chamber, and plural cylinders. A communication passage (not shown) providing direct communication between the control chamber and the discharge chamber is provided in the variable displacement compressor. A fixed orifice (see FIG. 1) for adjusting to balance pressure between the control chamber and the discharge chamber is provided in this communication passage.

The variable displacement compressor also includes a rotating shaft to be driven and rotated by an engine (not shown) installed outside the casing, a swash plate coupled to the rotating shaft in an eccentric state by a hinge mechanism in the control chamber, and plural pistons coupled to the swash plate and fitted reciprocatably in the respective cylinders. With using the capacity control valve V to be driven to open and close by electromagnetic force, a tilt angle of the swash plate is continuously changed by appropriately controlling pressure in the control chamber while utilizing suction pressure Ps of the suction chamber that suctions the fluid, discharge pressure Pd of the discharge chamber that discharges the fluid pressurized by the pistons, and control pressure Pc of the control chamber that houses the swash plate. Thereby, a stroke amount of the pistons is changed to control a discharge amount of the fluid.

Specifically, the lower the control pressure Pc in the control chamber is, the smaller the tilt angle of the swash plate with respect to the rotating shaft becomes, and the more the stroke amount of the pistons is reduced. However, when the pressure becomes fixed pressure or less, the swash plate is brought into a substantially perpendicular state with respect to the rotating shaft, that is, a state where the swash plate is slightly tilted from the exactly perpendicular state. At this time, the stroke amount of the pistons becomes minimum, and pressurization of the fluid in the cylinders by the pistons becomes minimum. Therefore, the discharge amount of the fluid to the discharge chamber is reduced, and the cooling ability of the air conditioning system becomes minimum. Meanwhile, the higher the control pressure Pc in the control chamber is, the larger the tilt angle of the swash plate with respect to the rotating shaft becomes, and the more the stroke amount of the pistons is increased. However, when the pressure becomes fixed pressure or more, the tilt angle of the swash plate with respect to the rotating shaft becomes maximum. At this time, the stroke amount of the pistons becomes maximum, and the pressurization of the fluid in the cylinders by the pistons becomes maximum. Therefore, the discharge amount of the fluid to the discharge chamber is increased, and the cooling ability of the air conditioning system becomes maximum.

Figure 1:
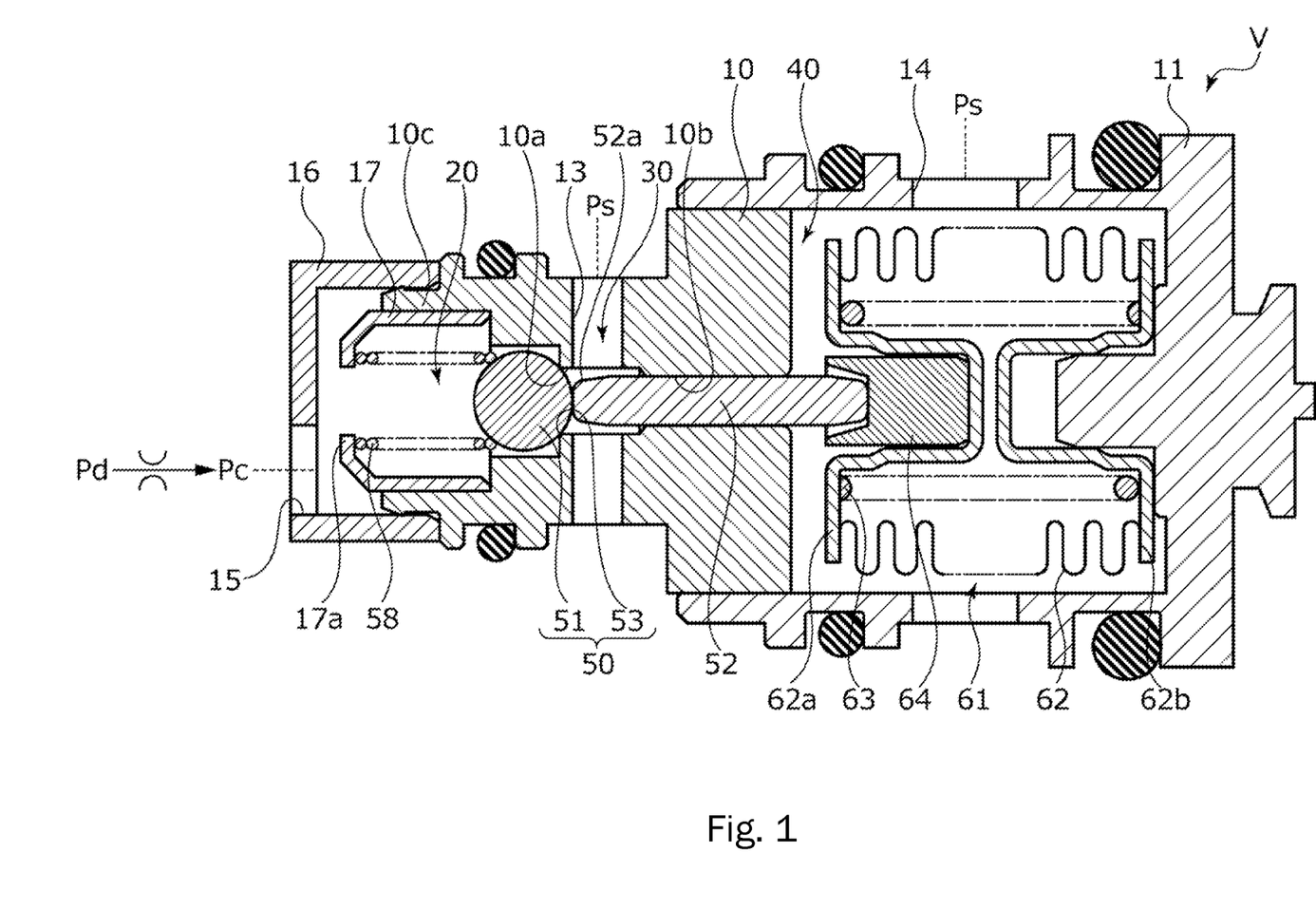
FIG. 1 is a sectional view showing a structure of a capacity control valve according to an embodiment of the present invention.
Figure 2:
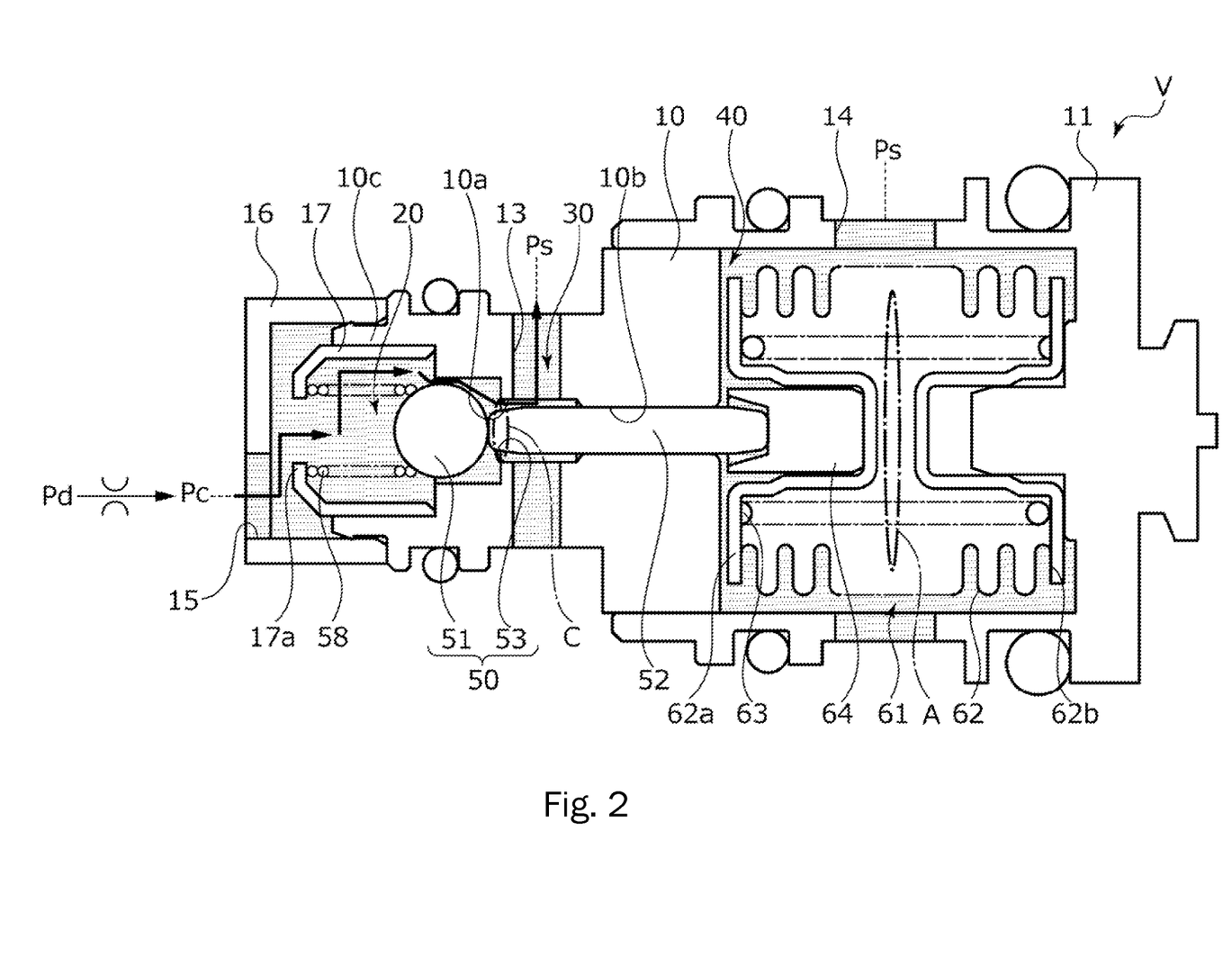
FIG. 2 is a sectional view showing a state where a main valve of the capacity control valve in the embodiment is closed.

As shown in FIG. 1, the capacity control valve V assembled into the variable displacement compressor performs open/close control of a main valve 50 by the suction pressure Ps in the suction chamber to open and close communication between a control port 15 and a suction port 13, so that the control pressure Pc in the control chamber is variably controlled. That is, the capacity control valve V according to the present invention is classified into a control valve of a type in which the outlet side of a variable displacement compressor is controlled (Pc-Ps control). The capacity control valve V of the present embodiment may be an external control valve (ECV) to be assembled into an external part of a variable displacement compressor, or may be an internal control valve (MCV) to be assembled into an internal part of a variable displacement compressor.

In the present embodiment, the main valve 50 is formed by a spherical valve element 51 attached and fixed to a leading end of a rod 52, and a valve seat 53 formed in an inner diameter portion of a valve housing 10 into which a leading end portion of this rod 52 is inserted. By bringing and separating the valve element 51 into contact with and from the valve seat 53, the main valve 50 is opened and closed.

Next, a structure of the capacity control valve V will be described. As shown in FIG. 1, the capacity control valve V is mainly formed by the valve housing 10 made of a metal material or a resin material, a case 11 fitted and fixed onto this valve housing 10, the valve element 51 arranged reciprocatably in the axial direction in the valve housing 10, and a pressure drive portion 61 arranged in the case 11, the pressure drive portion that applies axially leftward bias force to the valve element 51 in accordance with the suction pressure Ps in a pressure drive chamber 40.

The case 11 is formed in a bottomed cylinder whose axially left end portion is opened and whose right end portion is closed, and by inserting an axially right end portion of the valve housing 10 into the axially left end portion of this case 11, integrally connected and fixed in a substantially sealed state.

In the valve housing 10, the control port 15 communicating with the control chamber of the variable displacement compressor, the control port being opened in parallel to the axially direction, and the suction port 13 serving as a suction port which communicates with the suction chamber of the variable displacement compressor, the suction port being opened in the radial direction are formed. In the case 11, a second suction port 14 serving as a second suction port which communicates with the suction chamber of the variable displacement compressor, the second suction port being opened in the radial direction is formed. These ports are arranged in order of the control port 15, the suction port 13, and the second suction port 14 from the axially left side of the capacity control valve V.

The valve housing 10 is formed to pass through in the axial direction. By a filter 16 covering and fitting onto a leading end portion 10c thereof, foreign substances are suppressed from intruding into the valve housing 10. An opening portion formed to pass through an end surface of this filter 16 forms the control port 15. A tubular cap 17 is fitted into the leading end portion 10c of the valve housing 10, and in an inner peripheral portion of this cap 17, a spring 58 that retains and biases the valve element 51 in the rightward direction in the figure, that is, in the valve closing direction is provided. Further, this control port 15 is open at a lower position out of the axis of the main valve 50, and a tapered leading end portion 17a of the cap 17 faces on the inside of the control port 15. Thus, an effect of suppressing foreign substances from intruding is enhanced.

Inside the valve housing 10, a first valve chamber 20 communicating with the control port 15, the first valve chamber in which the valve element 51 is housed, and a second valve chamber 30 communicating with the suction port 13, the second valve chamber into which the rod 52 is inserted are formed. Inside the case 11, the pressure drive chamber 40 communicating with the second suction port 14, the pressure drive chamber in which the pressure drive portion 61 is housed is formed. A suction fluid of the suction pressure Ps flows into both the second valve chamber 30 and the pressure drive chamber 40 to provide the same pressure. Thus, a seal member such as an O ring is not required to be attached between the suction port 13 and the second suction port 14 on an outer surface of the case 11.

Inside the valve housing 10 and the case 11, the spherical valve element 51 and the rod 52 to which this valve element 51 is connected are arranged reciprocatably in the axial direction. In an inner peripheral portion of the valve housing 10, an insertion hole 10a having a smaller diameter than the valve element 51, and a guide hole 10b serving as a through hole which has a smaller diameter than this insertion hole 10a, the guide hole with which an outer peripheral surface of the rod 52 is slidable are formed to pass through at concentric positions. Further, in an inner diameter portion of the insertion hole 10a on the axially left side, the valve seat 53 with and from which an outer surface of the valve element 51 corresponding to a valve diameter area C can be brought into contact or separated is formed.

Inside the valve housing 10, the first valve chamber 20 and the second valve chamber 30 are openably and closably partitioned by contact and separation between the valve element 51 and the valve seat 53 that reciprocate in the axial direction. In detail, as shown in FIG. 2, when the main valve 50 is opened, the first valve chamber 20 and the second valve chamber 30 communicate with each other. As shown in FIG. 3, when the main valve 50 is closed, the first valve chamber 20 and the second valve chamber 30 are isolated from each other. Between an inner peripheral surface of the guide hole 10b and the outer peripheral surface of the rod 52, a slight gap is formed in the radial direction. The rod 52 is smoothly movable with respect to the valve housing 10 in the axial direction. A leading end portion 52a of the rod 52 to which the valve element 51 is connected is formed in a tapered shape having a small diameter. Thus, it is possible to ensure a flow passage of the fluid at the time of opening the main valve 50.

As shown in FIG. 1, the main valve 50 has the valve element 51 formed by a spherical body arranged in the first valve chamber 20, the rod 52 formed by an axial body having a smaller diameter than the valve element 51, the rod whose one end is connected to the valve element 51 and inserted into the guide hole 10b, and the pressure drive portion 61 to which the other end of this rod 52 is connected, the pressure drive portion that applies drive force in the axial direction to the valve element 51 via the rod 52.

An end portion of the spring 58 supported on the leading end portion 17a of the cap 17 is fitted to a left end portion of the valve element 51. This spring 58 biases the valve element 51 in such a manner that the valve element 51 is seated on the valve seat 53, that is, in the valve closing direction which is the rightward direction in the figure. A spring constant of the spring 58 is set to be smaller than a coil spring 63 provided in the pressure drive portion 61 to be described later.

The pressure drive portion 61 is housed in the pressure drive chamber 40, and mainly formed by a bellows core 62 formed to be extendable and contractible in the axial direction, the coil spring 63 built in this bellows core 62, and an adapter 64 fitted to a free end portion 62a of an axially left end of the bellows core 62. A base end portion 62b of an axially right end of the bellows core 62 is connected and fixed to the case 11.

The pressure drive portion 61 is in a state of biasing the valve element 51 in the valve opening direction via the rod 52 by bias force of the coil spring 63 compressed between the free end portion 62a of the bellows core 62 and the base end portion 62b. That is, the pressure drive portion 61 can apply drive force in the valve opening direction to the valve element 51, and receive reactive force in the valve closing direction by the spring 58.

Next, actions of the capacity control valve V, mainly actions of opening and closing the main valve 50 will be described.

First, actions of opening and closing at the time of normal control where the suction pressure Ps is relatively small will be described. As shown in FIG. 2, in the capacity control valve V, at the time of control where the suction pressure Ps is normal, by biasing the valve element 51 in the valve opening direction on the left side in the figure and separating from the valve seat 53, the main valve 50 is in an opened state.

In detail, to the valve element 51, to the axially right side, that is, in the closing direction, bias force $F_{sp}$ by the spring 58 is applied, bias force $F_{pc}$ obtained by multiplying the valve diameter area C by the control pressure Pc is applied, and further, bias force $F_{ps}$ obtained by multiplying an area A-C of a difference between a bellows effective area A and the valve diameter area C by the suction pressure Ps is applied. Meanwhile, to the valve element 51, to the axially left side, that is, in the opening direction, bias force $F_{bel}$ of the coil spring 63 in the bellows core 62 is applied. At the time of considering bias force of the bellows core 62 itself, the bias force of the bellows core 62 itself may be added to the bias force of the coil spring 63 itself.

That is, given that the axially right side is the positive side, force $F1=F_{sp}+F_{pc}+F_{ps}-F_{bel}$ is applied to the valve element 51. At the time of normal control, since the suction pressure Ps is small, by F1<0, that is, by biasing the valve element 51 to the axially left side and separating from the valve seat 53, the main valve 50 is opened with an opening degree according to the force F1. By changing designs of the valve diameter area C, the bellows effective area A, the spring 58, and the coil spring 63 to arbitrary size or characteristics, it is possible to set to desired Pc-Ps characteristics.

Next, actions of opening and closing in a case where an operation of increasing an output of the air conditioning system is performed, an output of an expansion valve of the air conditioning system is increased, and a flow rate and the suction pressure Ps of the suction fluid supplied to the suction chamber of the variable displacement compressor are increased will be described. As shown in FIG. 3, in the capacity control valve V, by increasing the suction pressure Ps, the valve element 51 is biased in the valve closing direction on the right side in the figure and seated on the valve seat 53, so that the main valve 50 is in a closed state.

In detail, to the valve element 51, as well as the above description, to the axially right side, that is, in the closing direction, the bias force $F_{sp}$ by the spring 58 is applied, the bias force $F_{pc}$ obtained by multiplying the valve diameter area C by the control pressure Pc is applied, and further, the bias force $F_{ps}$ obtained by multiplying the area A-C of the difference between the bellows effective area A and the valve diameter area C by the suction pressure Ps is applied. Meanwhile, to the valve element 51, to the axially left side, that is, in the opening direction, the bias force ($F_{bel}$) of the coil spring 63 in the bellows core 62 is applied. That is, given that the axially right side is the positive side, force $F2=F_{sp}+F_{pc}+F_{ps}-F_{bel}$ is applied to the valve element 51. At the time of control where the suction pressure Ps is maximum, since the suction pressure Ps is large, by F2≥0, that is, by biasing the valve element 51 to the axially right side and seating on the valve seat 53, the main valve 50 is closed.

In such a way, the valve element 51 receives the force in the closing direction by the control fluid of the control pressure Pc. Thus, even when a change is made in such a manner that the control pressure Pc is increased, such malfunction that the main valve 50 is opened does not occur. Therefore, it is possible to apply this capacity control valve to the variable displacement compressor of the type in which the stroke amount of the pistons is changed based on the increase in the control pressure Pc.

The rod 52 that transmits the force from the pressure drive portion 61 to the valve element 51 is slidably arranged in the guide hole 10b formed in the valve housing 10. Thus, even when the control fluid of the control pressure Pc flows from the control port 15 into the suction port 13 at the time of opening the main valve 50, it is possible to suppress inflow to the pressure drive chamber 40 in which the pressure drive portion 61 is housed. Therefore, the pressure drive portion 61 senses highly responsively by the suction pressure Ps of the suction fluid.

The spring 58 that biases the valve element 51 in the closing direction is arranged. Thus, the valve element 51 is biased to the valve seat 53 at the time of closing the main valve 50, and the valve element 51 receives from the rod 52 and the spring 58 the forces in opposite directions from each other at the time of opening the main valve 50. Therefore, even when vibration, etc. occurs, a closed or opened state of the main valve 50 is stably maintained.

Further, the valve element 51 is a spherical body. Thus, it is possible to sufficiently ensure a pressure receiving area where the valve element 51 receives from the suction fluid and the control fluid.

The second suction port 14 with which the suction fluid of the suction pressure Ps communicates is formed in the case 11 fixed to the valve housing 10, the case that houses the pressure drive portion 61. Thus, with a simple structure, it is possible to separate and isolate the pressure drive chamber 40 in which the pressure drive portion 61 is housed, and the first valve chamber 20 and the second valve chamber 30 in which the main valve 50 is arranged from each other.

Figure 4:
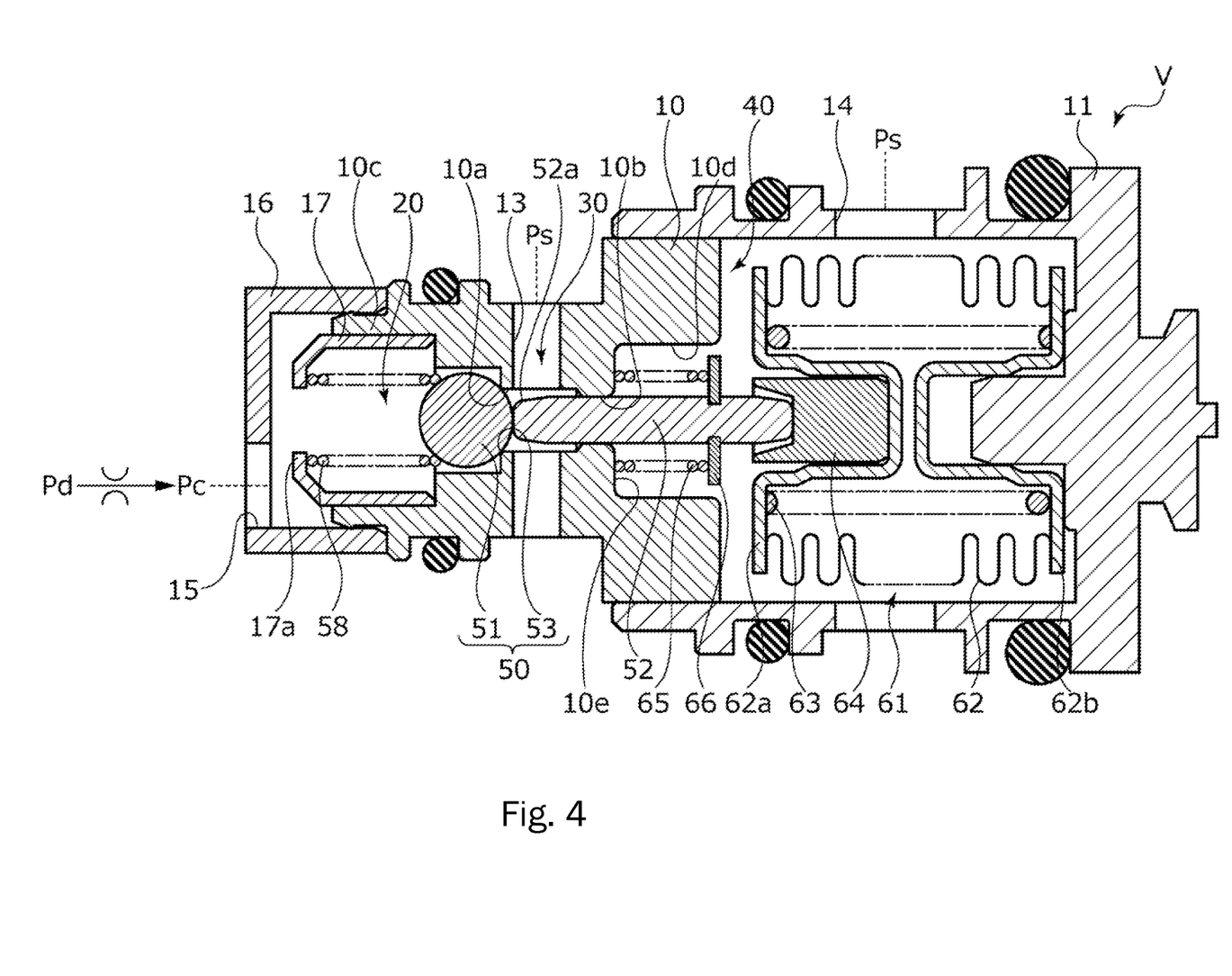
FIG. 4 is a sectional view showing a structure of a capacity control valve of a modified example of the capacity control valve in the embodiment.

Next, a capacity control valve according to a modified example will be described with reference to FIG. 4. The same configurations as the above embodiment will be given the same reference signs and description is omitted.

Inside the valve housing 10 and the case 11, the spherical valve element 51 and the rod 52 to which this valve element 51 is connected are arranged reciprocatably in the axial direction. In the inner peripheral portion of the valve housing 10, the insertion hole 10a having a smaller diameter than the valve element 51, the guide hole 10b serving as a through hole which has a smaller diameter than this insertion hole 10a, the guide hole with which the outer peripheral surface of the rod 52 is slidable, and an enlarged diameter hole 10d whose diameter is enlarged more than this guide hole 10b are formed to pass through at concentric positions. Further, in the inner diameter portion of the insertion hole 10a on the axially left side, the valve seat 53 with and from which the valve element 51 can be brought into contact or separated is formed.

An end portion of a retaining spring 65 supported by a rim portion 66 which is attached to the outer peripheral surface of the rod 52 is fitted to an enlarged diameter step portion 10e of a left end of the enlarged diameter hole 10d. This retaining spring 65 biases the valve element 51 in such a manner that the valve element 51 is retained while being seated on the valve seat 53, that is, in the valve closing direction which is the rightward direction in the figure.

By doing so, in the capacity control valve V, in a case where the suction pressure Ps is increased, it is possible to increase the bias force to bias the valve element 51 in the valve closing direction on the right side in the figure, and by seating on the valve seat 53, the main valve 50 is in a reliably closed state.

Figure 3:
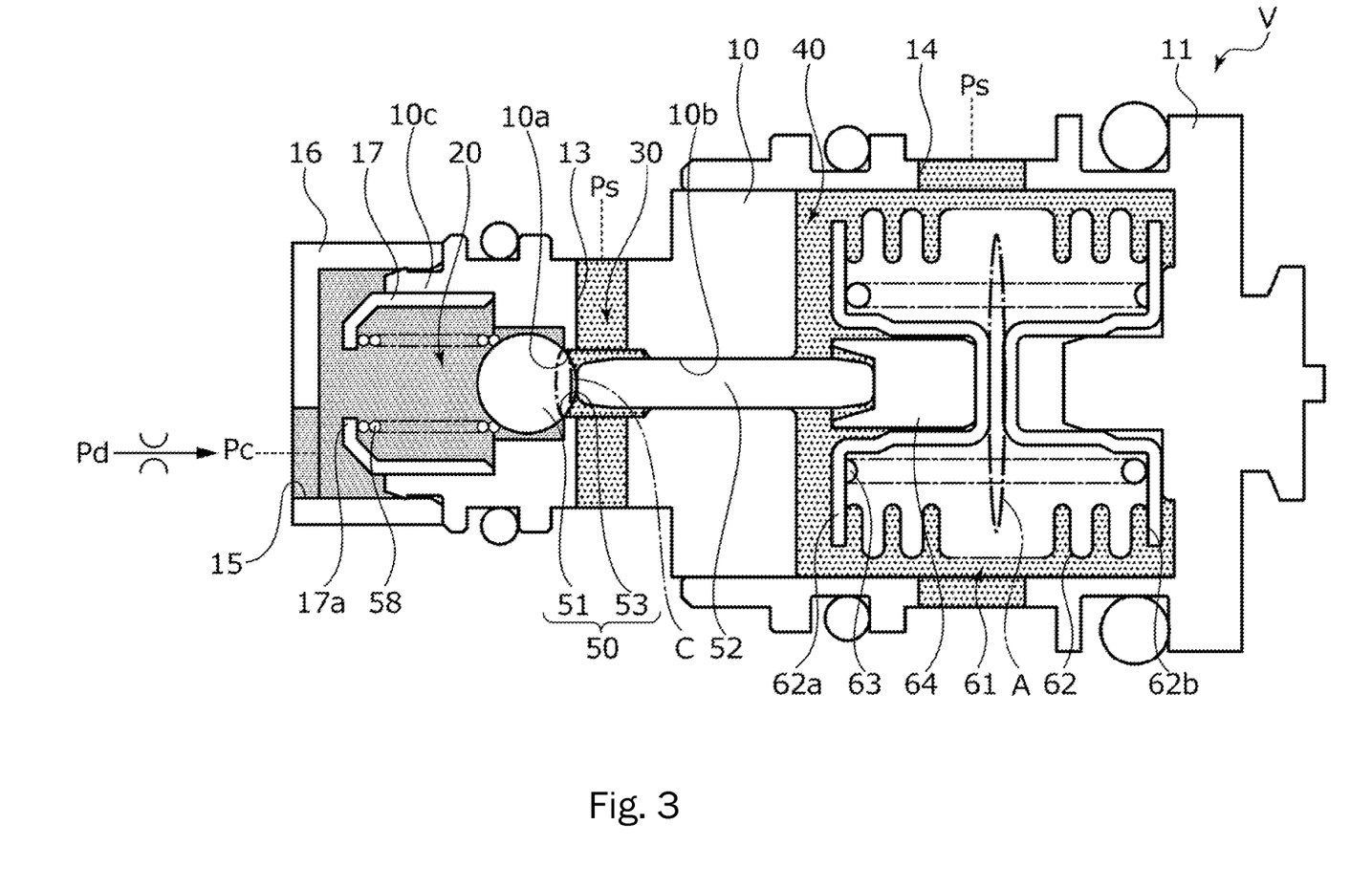
FIG. 3 is a sectional view showing a state where the main valve of the capacity control valve in the embodiment is opened.

In detail, to the valve element 51, as well as the above description, to the axially right side, that is, in the closing direction, the bias force $F_{sp}$ by the spring 58 is applied, the bias force $F_{pc}$ obtained by multiplying the valve diameter area C by the control pressure Pc is applied, and further, the bias force $F_{ps}$ obtained by multiplying the area A-C of the difference between the bellows effective area A and the valve diameter area C by the suction pressure Ps is applied (see FIG. 3). In addition to this, bias force $F_{sp2}$ by the retaining spring 65 is applied. Meanwhile, to the valve element 51, to the axially left side, that is, in the opening direction, the bias force $F_{bel}$ of the coil spring 63 in the bellows core 62 is applied. That is, given that the axially right side is the positive side, force $F3=F_{sp}+F_{pc}+F_{ps}+F_{sp2}-F_{bel}$ is applied to the valve element 51. At the time of control where the suction pressure Ps is maximum, since the suction pressure Ps is large, by F3≥0, that is, by biasing the valve element 51 to the axially right side by high bias force and seating on the valve seat 53, the main valve 50 is reliably closed.

In such a way, in a case where the suction pressure Ps is increased, and even when the bellows core 62 is contracted, the rod 52 follows this contraction of the bellows core 62 and operates together. Thus, it is possible to retain the rod 52 and to improve durability thereof.

The retaining spring 65 is not limited to the above modified example. For the rod 52, the bias force may be applied to the axially left side, that is, in the opening direction. By doing so, it is possible to integrally retain the rod 52 and the valve element 51.

The embodiment of the present invention is described above with the drawings. However, specific configurations are not limited to the embodiment but the present invention includes changes and additions within the range not departing from the scope of the present invention.

For example, in the above embodiment, the valve element 51 forming the main valve 50 and the rod 52 are connected and fixed. However, the present invention is not limited to this but the valve element and the rod may be separably abutted, or the rod and the valve element may be integrated, that is, the rod may also serve as the valve element.

For example, in the above embodiment, the valve housing 10 and the case 11 are formed as separate bodies. However, the valve housing and the case may be integrally formed.

The coil spring may not be used inside the pressure drive portion 61 but the bellows core 62 may have bias force.

REFERENCE SIGNS LIST

10 Valve housing
10*a* Insertion hole
10*b* Guide hole (through hole)
11 Case
13 Suction port
14 Second suction port (Suction port)
15 Control port
20 First valve chamber
30 Second valve chamber
40 Pressure drive chamber
50 Main valve
51 Valve element
52 Rod
53 Valve seat
58 Spring
61 Pressure drive portion
62 Bellows core
63 Coil spring
64 Adapter
65 Retaining spring
Pc Control pressure
Pd Discharge pressure
Ps Suction pressure
V Capacity control valve

The invention claimed is:

1. A capacity control valve comprising:
a valve housing provided with a first suction port through which a suction fluid of suction pressure passes, and a control port through which a control fluid of control pressure passes;
a pressure drive portion including a bellows core that is housed in a pressure drive chamber formed inside the valve housing so as to communicate with the first suction port, that is formed to be extendable and contractible in an axial direction, and that receives a force in a contracting direction from the suction fluid, the contracting direction being a direction in which the pressure drive portion is contractable; and
a main valve formed by a valve element that receives a force in a valve opening direction of the main valve from the pressure drive portion, and a valve seat with and from which the valve element is brought into contact and separated, wherein the valve element is arranged to receive a force in a valve closing direction of the main valve from the control fluid,
the pressure drive portion further includes a coil spring that is housed inside the bellows core, which coil spring is configured to bias the bellows core at all times in a direction in which the bellows core is extended in the axial direction,
the capacity control valve further comprises a tubular cap which is attached to an end portion of the valve housing on a side remote from the pressure drive portion in the axial direction, an inside of which communicates with a space having the valve element housed therein, and which has a tapered leading end portion on a side remote from the valve element in the axial direction, and
the control fluid supplied from the control port passes through an opening of the tapered leading end portion and acts on the valve element.

2. The capacity control valve according to claim 1, wherein
a through hole is formed in the valve housing, and a rod that transmits the force in the valve opening direction of the main valve from the pressure drive portion to the valve element is slidably fitted into the through hole.

3. The capacity control valve according to claim 2, wherein
a spring that biases the valve element in the valve closing direction of the main valve is arranged in the valve housing.

4. The capacity control valve according to claim 2, wherein
the valve element is a spherical body.

5. The capacity control valve according to claim 2, comprising:
a case fixed to the valve housing and having the pressure drive portion housed therein, wherein
the case is provided with a second suction port through which the suction fluid of the suction pressure passes.

6. The capacity control valve according to claim 1, wherein
a spring that biases the valve element in the valve closing direction of the main valve is arranged in the valve housing.

7. The capacity control valve according to claim 6, wherein
the valve element is a spherical body.

8. The capacity control valve according to claim 6, comprising:
a case fixed to the valve housing and having the pressure drive portion housed therein, wherein
the case is provided with a second suction port through which the suction fluid of the suction pressure passes.

9. The capacity control valve according to claim 1, wherein
the valve element is a spherical body.

10. The capacity control valve according to claim 9, comprising:
a case fixed to the valve housing and having the pressure drive portion housed therein, wherein
the case is provided with a second suction port through which the suction fluid of the suction pressure passes.

11. The capacity control valve according to claim 1, comprising:
a case fixed to the valve housing and having the pressure drive portion housed therein, wherein the case is provided with a second suction port through which the suction fluid of the suction pressure passes.

\* \* \* \* \*